March 3, 1959 R. K. JACKSON 2,876,314

SWITCH

Filed Feb. 8, 1956

INVENTOR.
RUSSELL KENNETH JACKSON
BY
Busser, Smith + Harding
ATTORNEYS

United States Patent Office 2,876,314

Patented Mar. 3, 1959

2,876,314

SWITCH

Russell K. Jackson, Pennsauken, N. J., assignor to Radio Condenser Company, Camden, N. J., a corporation of New Jersey Application February 8, 1956, Serial No. 564,154

6 Claims. (Cl. 200—166)

This invention relates to switches and particularly to the affixing thereto of small elements such as coils, resistors or capacitors by soldering.

The invention is particularly applicable to the solution of problems involved in assemblage of elements with selection switches in high frequency apparatus such as television tuners.

For example, in television tuners it is necessary to provide switching between frequency bands or channels and for this purpose it is convenient to use multi-position switches with coils soldered to soldering lugs integrally formed with engageable contacts of a switch. The coils involved have quite small inductances so that the lengths of their leads are quite critical in determining the total inductances involved. Heretofore, in the assemblage of inductance coils with switch elements it has generally been necessary to provide fixtures for positioning the coils prior to soldering though even then variations of lead lengths generally occurred, necessitating adjustments of the coils by a so-called "spiking" procedure consisting of separating the coil turns to bring the inductances involved to proper values.

The general object of the present invention is to provide elements and procedure whereby the assembly of coils to switch elements may be greatly facilitated with elimination of the necessity for providing fixtures and with the attainment of such uniformity in assembly that preformed coils may be used and located with a minimizing of the necessity for adjustment of their turns to secure desired inductance values. This result is accomplished by providing a switch assembly with soldering tabs or lugs of such type that the coil elements are relatively tightly held frictionally prior to soldering and may be readily adjusted to proper positions which may be ascertained by feeling by the person engaged in the assembly operation.

While the invention will be specifically described as applied to the mounting of small coils, it will become evident that it is also applicable to the mounting of resistors, capacitors or the like where similar critical conditions of position and lead length arise.

The objects above indicated as well as others particularly relating to details of construction will become apparent from the following description read in conjunction with the accompanying drawings in which.

Figures 1, 4:
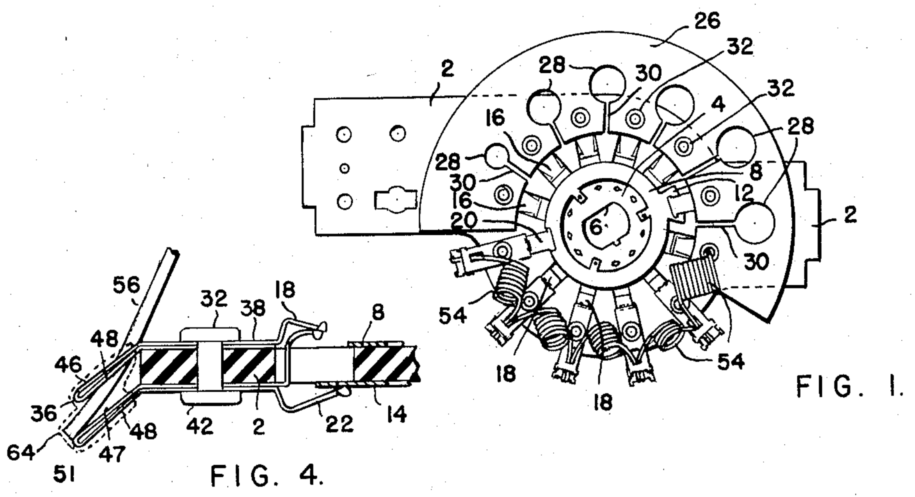
Figure 1 is a top plan view showing a wafer type switch assembly having coils mounted thereon prior to soldering in accordance with the present invention.
Figure 4 is an enlarged radial sectional view showing the fashion in which one or more leads are associated with soldering lugs.

There is indicated at 2 a rigid wafer of insulating material such as is commonly used in the construction of wafer type switches. Mounted concentrically in an opening in the wafer 2 is a second circular insulating wafer 4 providing with a non-circular central opening 6 for the reception of an adjusting shaft. Secured to the opposite faces of the wafer 4 are annular contact members 8 and 10 of conducting sheet metal provided with connection-making projections 12 and 14. As these rotate they make selective contacts with fixed contact members 16, 18, 20, 22 and 24 to effect selective switching in conventional fashion. What is illustrated is a tuner for the present very high frequency television channels and for this purpose tuning for the higher frequency group of channels involves the selection of low inductance elements provided by an arcuate metallic segment 26 provided with graduated openings 28 and communicating slots 30, the segment being secured to the wafer 2 by rivets 32 with the inductance elements thereby provided connected to the contact members 16. The assembly so far described is conventional and forms no part of the present invention.

Figures 3, 5:
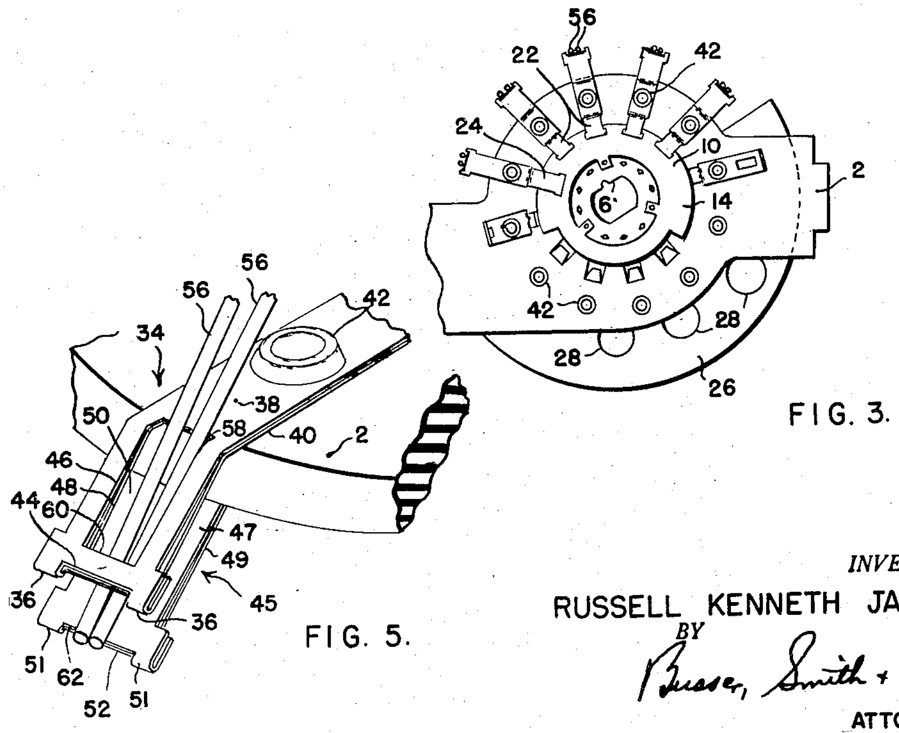
Figure 3 is an inverted plan view of the same.
Figure 5 is a perspective view of the same.

To provide for tuning of the lower frequency group of channels it is not practical to provide the selective inductances by a simple arrangement similar to what has just been mentioned for the higher frequency group of channels, and instead actual wire coils are used such as indicated at 54. Such coils have heretofore been soldered to lugs formed integrally with contact members such as 18, 20, 22, and 24 and preparation for soldering has required the use of positioning fixtures for the coils and the individual soldering of the leads or pairs of leads at the lugs. Errors in position of the coils has also required considerable adjustment by the "spiking" procedure referred to. In accordance with the present invention the conventional structure and procedure have been modified as follows:

As will be more particularly evident from Figures 4 and 5 pairs of lugs are provided as generally indicated at 45 and 34. Each lug 34 comprises a piece of thin spring metal doubled upon itself as indicated at 36 to form, for best spring action, a pair of plies 38 and 40 which are secured to the wafer 2 by a rivet 42, the upper ply 38 being continued inwardly of the rivet 42 to provide either a fixed contact 18 or a fixed contact 20, the latter being arranged to make continuous contact with the annular conductor element 8 while the former are selectively engaged by the projection 12, the arrangement being such as to exert a spring action for good contact. The plies 38 and 40 are desirably cut away at 44 to permit uniform bending or folding at 36 and, as will appear, good frictional contact with the coil leads. The plies 38 and 40 are also cut away as indicated at 46 and 48 to provide an opening 50 and their portions extending over the edge of the wafer 2 are bent downwardly as indicated in Figures 4 and 5.

A lower lug 45 is provided in the form of plies 47 and 49 by bending of spring metal at 51 with cutting away of the metal at 52. These lower lugs 45 are also secured to the wafer 2 by means of rivets 42 and plies 49 are extended inwardly to provide the contact members 22 and 24, the latter making a continuous contact with the conducting member 10 while the former are selectively engaged by the projecting contact 14. As indicated in Figures 4 and 5 the portion of the lug extended beyond wafer 2 is deflected downwardly in general parallelism with the overlying portion of the lug 44.

Figure 2:
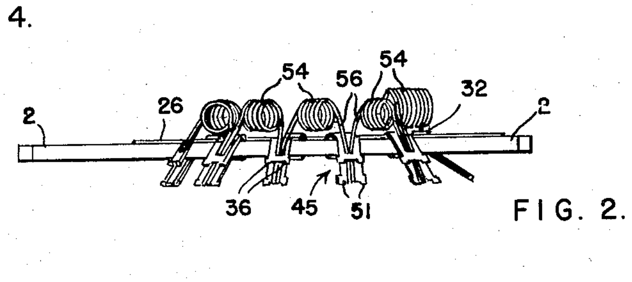
Figure 2 is an elevation of the same.

In the assembly operation the small coils 54 have their lead ends 56, from which insulation is removed, thrust downwardly through openings 50 and into engagement with the surfaces of the plies 47, overlapping the edges provided at 52. As will be clear particularly from Figure 4, the coil leads are slightly sprung to achieve this result so that each lead makes contact at three edges as indicated at 58, 60 and 62 in Figure 5. A frictional engagement is thus provided and the assembler may force the leads to a proper position which is determined by a slight projection of the ends of leads beyond the edges 62, this projection being easily ascertained by feeling with the finger to insure that the coil is properly placed with uniformity of position of the leads with respect to the lugs. As will be evident from Figure 2, in some cases the leads of two coils are associated with a pair of lugs while in one or more other instances the lead of only a single end coil may be associated with a single pair of lugs.

Following such assembly the lugs may be dipped in solder to provide blobs of solder as indicated at 64 imbedding the lead ends and filling the space between, and coating, the lugs to secure a good connection.

It will be evident that the arrangement and procedure which has been described provides uniformity of electrical characteristics determinable by feeling the ends of the leads, and since it is unnecessary to employ any jigs the assembly is greatly facilitated, the leads being held frictionally in proper position prior to the application of solder.

It will be evident that the invention is applicable to the mounting of other electrical elements than coils, for example, to the mounting of small resistors and capacitors.

What is claimed is:

1. A switch element for the mounting of small electrical elements provided with leads comprising an insulating wafer, a rotary contact-making member mounted thereon, and soldering lug assemblies secured to said wafer and arranged for contact with said member, each of said assemblies comprising a pair of members having spring portions extending beyond an adjacent edge of said wafer on opposite sides thereof, one of said spring portions being provided with an elongated opening, and said spring portions extending in spaced relation but adjacent to each other in approximate parallelism.

2. A switch element according to claim 1 in which each of said portions comprises a pair of plies joined at the free ends of said portions.

3. A switch element according to claim 1 in which the elongated opening has its major extent transverse to the adjacent edge of the wafer.

4. A switch element according to claim 1 in which both spring portions extend at an angle to the plane of the wafer with that which has said elongated opening extending in a direction across the edge of the wafer.

5. A switch element according to claim 2 in which both spring portions extend at an angle to the plane of the wafer with that which has said elongated opening extending in a direction across the edge of the wafer.

6. A switch element according to claim 3 in which both spring portions extend at an angle to the plane of the wafer with that which has said elongated opening extending in a direction across the edge of the wafer.

References Cited in the file of this patent

UNITED STATES PATENTS

| | | |
|---|---|---|
| 2,128,279 | Allison | Aug. 30, 1938 |
| 2,436,750 | Gray | Feb. 24, 1948 |
| 2,554,724 | Williams | May 29, 1951 |
| 2,598,534 | Gordon | May 27, 1952 |